United States Patent [19]
Florence et al.

[11] 3,810,089
[45] May 7, 1974

[54] DISCRIMINATING SIGNAL WARNING AND SELECTIVELY OPERABLE TIME DELAY CONTROL SYSTEM FOR LIGHTING CIRCUIT

[75] Inventors: Dennis E. Florence, Detroit; Frank R. Winders, Jr., Birmingham; Charles E. Wontrobski, Southfield, all of Mich.

[73] Assignee: Chrysler Corporation, Highland Park, Mich.

[22] Filed: Sept. 30, 1968

[21] Appl. No.: 763,712

[52] U.S. Cl................ 340/52 D, 315/83, 317/141 S
[51] Int. Cl............................. B60g 5/00, B60g 1/04
[58] Field of Search............ 340/75; 315/77, 82, 83

[56] References Cited
UNITED STATES PATENTS

| | | | |
|---|---|---|---|
| 2,592,968 | 4/1952 | Soule | 340/223 UX |
| 2,799,843 | 7/1957 | Savino | 315/77 UX |
| 2,806,980 | 9/1957 | Shapiro | 315/83 |
| 2,843,843 | 7/1958 | Davis | 340/63 X |
| 3,209,326 | 9/1965 | Heiser | 340/63 |
| 3,464,060 | 8/1969 | Arditti | 340/64 |
| 3,530,333 | 9/1970 | Roberts | 315/83 |
| 3,544,838 | 12/1970 | Carruth et al. | 315/83 |
| 3,544,961 | 12/1970 | Pasley et al. | 340/53 |
| 3,546,527 | 12/1970 | Chunn et al. | 315/82 |
| 3,594,723 | 7/1971 | Puig | 340/63 |
| 3,391,302 | 7/1968 | Weingarden | 315/83 |
| 3,211,951 | 10/1965 | Skinner et al. | 340/56 X |
| 3,274,434 | 9/1966 | Miller | 315/82 |
| 3,374,394 | 3/1968 | Miller | 315/82 |
| 3,376,548 | 4/1968 | Jabbar et al. | 340/75 |
| 3,388,288 | 6/1968 | Kibler | 315/77 |
| 3,389,296 | 6/1968 | Carruth | 315/82 |
| 3,440,487 | 4/1969 | Wu et al. | 315/77 |
| 3,476,975 | 11/1969 | Brock | 315/83 |

*Primary Examiner*—Kenneth N. Leimer
*Attorney, Agent, or Firm*—Harness, Talburtt and Baldwin

[57] ABSTRACT

A signal warning and selectively operable time delay control system for a vehicle lighting circuit wherein a warning signal is provided if the lighting circuit inadvertently remains energized through the vehicle light control switch but (the signal) is inhibited if the lighting circuit is temporarily maintained energized from the vehicle battery through the time delay controller; and further wherein a selection of immediate or delayed de-energization of the lighting circuit is available to the operator in accordance with a predetermined sequence, program or relative order of turn-off operation of the vehicle light control switch and the vehicle ignition switch.

10 Claims, 1 Drawing Figure

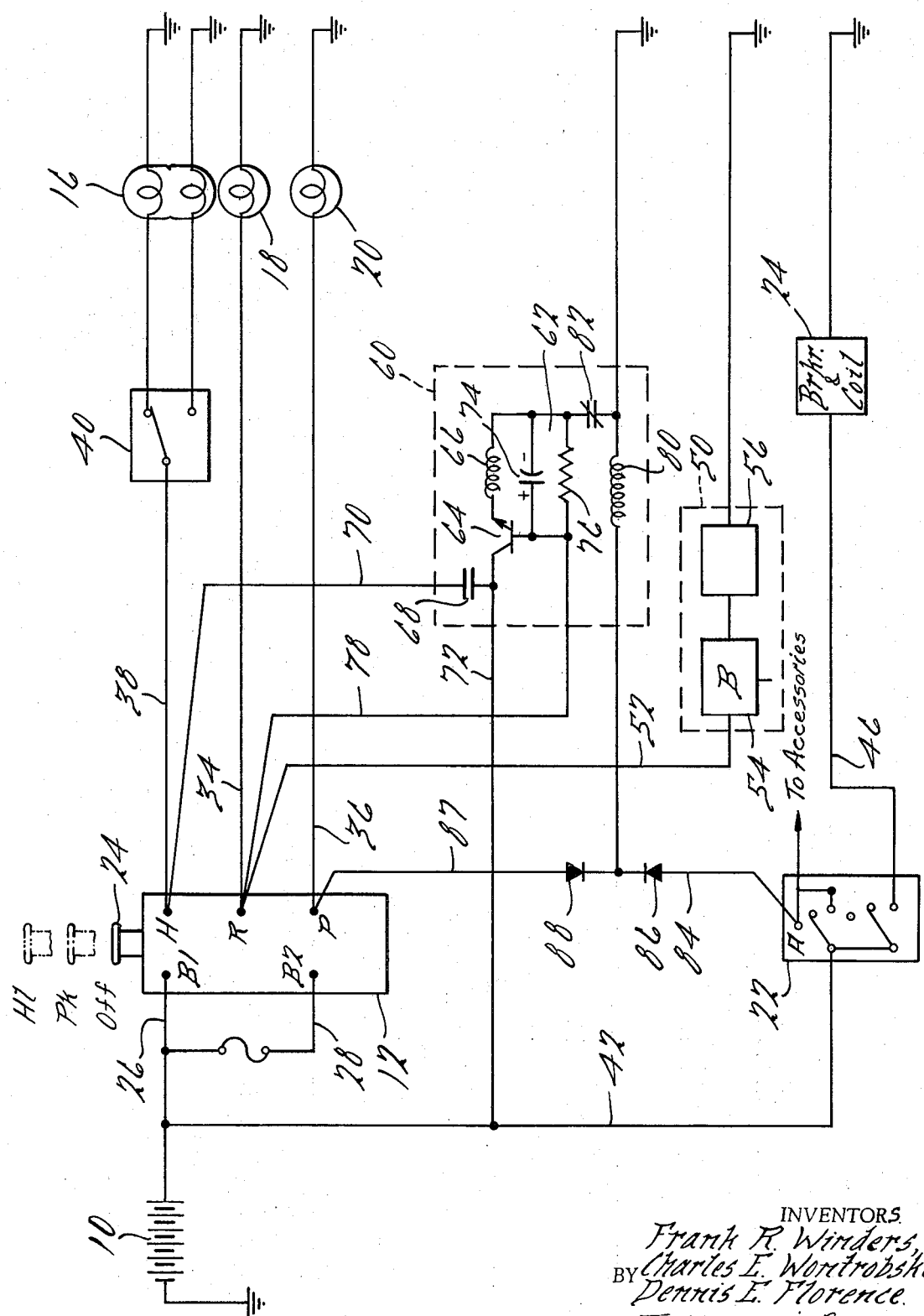

DISCRIMINATING SIGNAL WARNING AND SELECTIVELY OPERABLE TIME DELAY CONTROL SYSTEM FOR LIGHTING CIRCUIT

BACKGROUND OF THE INVENTION

The invention relates to signal warning devices for lighting circuits of vehicles equipped with time delay lighting circuit controllers and to the incorporation of such controllers in vehicle lighting circuits for selective control operation thereof.

Prior Art

Various forms of signal warning reminder devices have been proposed heretofore for providing a signal warning if the operator inadvertently fails to disconnect a lighting circuit or other current utilizing device from the vehicle battery. As typified by U.S. Pat. No. 2,507,398, such devices may take the form of a buzzer connected to the vehicle ignition and/or lighting circuit to provide an audible warning signal if the operator has failed to disconnect the lighting circuit through the light control switch.

Another useful convenience item for vehicle lighting circuits is a time delay controller for maintaining the headlamps energized for a temporary period to illuminate external surroundings, as during periods of departure from the vehicle under dark conditions. With the incorporation of both types of above mentioned devices in a vehicle lighting circuit, the present invention recognizes the need for compatibly relating the operation of the signal warning device to the time delay controller so that the reminder signal is provided only when the lighting circuit remains energized through inadvertence or oversight of the operator, but no signal is provided when the lighting circuit is being temporarily maintained by the time delay controller. Operation of the warning device during the delay de-energization period effected from the time delay controller would create a false alarm condition and resulting confusion, when in fact there is no need to alert the attention of the operator.

The invention further recognizes that there are occasions during the operation of vehicles equipped with such delay turn-off controllers when it is desired to extinguish the lighting circuit immediately and to provide normal extinguishing control thereover. Delay devices which provide the delay each time the light control switch is turned off, are not selectively operable. Automatic circuit control devices as typified by U.S. Pat. Nos. 2,806,980 and 2,931,918 require that the light control switch remain on or closed to obtain a delayed turn-off and require the addition of defeat and/or restoration switches to defeat the controller and to restore operation of the lighting circuit. Devices of this latter character also employ circuit breaking controller elements in series with or in the direct feed path of the lighting circuit and involve considerable disruption and modification to the customary wiring provided on conventional vehicles.

Accordingly, the present invention has for its general object to provide a vehicle lighting circuit with a reminder and time delay lighting controller system in which the operation of the reminder portion of the system is related to that of the time delay controller and in which the controller portion of the system is selectively operable to provide for delayed or immediate de-energization of the lighting circuit.

A related object is to provide a system of the above character the operation of which will not confuse the operator, nor require controls other than those customarily provided with a vehicle and operated in accordance with the normal operating habits of the operator, nor interfere with existing wiring provided on conventional vehicles.

Another object is to provide in a vehicle equipped with a time delay lighting controller, a reminder signal producing device that distinguishes or discriminates against a lighting condition in which the lighting circuit is temporarily maintained by the time delay controller and produces a warning signal to remind the operator only in the event of operator failure to turn off the vehicle light control switch.

Another object is to provide a vehicle lighting circuit with a time delay lighting controller which affords operator selection of delayed or immediate de-energization of the controlled lighting circuit.

A related object is to provide a time delay lighting controller for a vehicle lighting circuit that is manually selectively operable to provide for delayed or immediate de-energization of the controlled vehicle lighting circuit from the vehicle light control switch and vehicle ignition switch in accordance with a predetermined relative order of turn-off operation thereof.

Yet another object is to provide a time delay lighting controller for a vehicle equipped with headlamps and parking lamps in which the controller provides for delayed de-energization of the headlamp circuit of the vehicle and in which de-energization of the parking lamp circuit will not turn on the headlamp circuit.

SUMMARY

Towards accomplishment of the above and related objects the present invention provides in a vehicle equipped with an electrical ignition system, headlamp, taillamp, and parking lamp lighting circuits, a source of current, and a conventional manually controlled light control switch and ignition switch; a signal warning circuit that is connected to the vehicle taillamp circuit for energization therewith through the vehicle light control switch, and a time delay controller, which includes automatically controlled switching means therein connected by a pair of circuit conductors directly to the source and to the vehicle headlamp circuit to provide an auxiliary energizing path about the light control switch to the vehicle headlamp circuit and which further includes a circuit conductor connected therefrom to the accessory circuit connected side of the ignition switch disabling said controller while the ignition switch is closed and disabling or inhibiting the controller if the light control switch is opened prior to the ignition switch.

DESCRIPTION OF THE PREFERRED EMBODIMENT

With reference to the single FIGURE of the drawings, there is illustrated in electrical schematic form a vehicle lighting control circuit having a discriminating form of signal warning device and a selectively operable time delay controller incorporated therein in accordance with the foregoing aspects of the invention.

The illustrated circuit comprises the vehicle storage battery 10, the vehicle light control switch 12 for the headlamps, taillamps and parking lamps represented at 16, 18 and 20, respectively, and a vehicle ignition switch 22 connected to the ignition system comprising coil 24.

The vehicle light control switch 12 is the conventional operator controlled, multiple position switch customarily provided on automotive vehicles and operated by a pull or rocker type actuator 24 from an Off position to a Park position and to a Headlight position. The switch, which may contain an internal breaker, is shown connected over conductor 26 and fused conductor 28 extending from the line or input side of the switch to the positive side of the battery Conductors 36 and 34 extend from the parking terminal (P) and the rear or taillight terminal (R) of the switch to supply current at battery potential to the parking lamps and taillamps which are simultaneously energized over separate circuits when the switch is in the Park position. With the switch actuator moved to the Headlight position, current is supplied at battery potential to the headlamps and taillamps over separate circuit conductors 38 and 34 from the headlight terminal (H) and taillight terminal (R) on the load connected side of the switch. Conductor 38 includes the customary foot operated dimming switch 40 for selecting either the high or low beam filaments or lamps of the headlighting system.

The ignition switch 22 is the operator controlled, key-actuated ignition lock switch customarily provided on the vehicle for the ignition system thereof. The switch is shown connected by circuit conductor 42 to the battery 10 and by circuit conductor 46 to supply current therethrough to the ignition coil 24 and to any of the vehicle accessories, other than the above mentioned lighting circuits, that are connected to the accessory side of the ignition switch.

The signal warning components and time delay lighting controller are depicted in dashed and dotted outline at 50 and 60, respectively. In accordance with one aspect of the invention these components are connected to the above described vehicle wiring circuitry in a manner without disruption of the existing wiring or disturbing the operation of the described controls thereof, which are advantageously employed in combination therewith for accomplishment of the aforementioned useful results and effects from the simplified resulting system.

The signal warning portion 50 of the system is connected by circuit conductor 52 to the taillight terminal side of the vehicle light control switch and includes a signal warning device 54 and a vehicle condition responsive device 56 jointly controlling the operation of the warning device with the light control switch. The warning device 54 may be a signal lamp and/or audible signal producing device as shown in aforementioned Pat. No. 2,507,398 and connected to the device 56. The latter device may be a ground connected seat or door actuated switch controlling the operation of the alarm device, a common practice as typified by U.S. Pat. Nos. 2,349,740; 2,613,258, 2,610,238 and 2,742,630, for example.

The time delay controller 60 is shown as a generalized form of relay controller having an RC timing network 62 in the input circuit of an electronic amplifier device shown as an NPN transistor 64 connected to the coil 66 of the relay. A set of normally open switching contacts of the relay are shown as 68 connected by circuit conductor 70 to the headlight terminal side of the light control switch 12 and by another circuit conductor 72 to any point at which elevated battery potential +12v is available. Contacts 68 thus effectively shunt the headlight portion of the light control switch 12 and, when closed, provide an auxiliary energizing circuit to the vehicle headlamp circuit if the light control switch is off or open. Conductor 72 is connected internally of the time delay controller to provide +12v. operating potential to the collector electrode of the transistor 64. The emitter electrode of the transistor is connected to one side of the relay coil 66 whose other side is returned to ground or the low potential side of the battery, as though a set of normally closed contacts 82 of the relay coil 80 connected by circuit conductor 84 to the accessory or on side of the vehicle ignition switch.

In the illustrated form of the time delay controller, the charging of the capacitor 74 of the RC timing network is effected from the vehicle current source through circuit conductor 78 connected to the taillight terminal (R) of the actuated light control switch and whenever the ignition switch 22 is off or open. Under these conditions, transistor 64 is conducting and the relay 66 is energized. When the light control switch 12 is de-actuated or moved to its Off position, the capacitor is no longer connected in charging circuit relation with the battery and commences to discharge through the timing resistor 76. The decaying potential developed across the resistor 76 maintains the transistor conducting for a predetermined time interval determined by the RC time constant of the timing network. The relay 66 is thus energized and retains its contacts 68 in closed circuit completing relation establishing an auxiliary parallel energizing transfer circuit about the headlight control portion of the light control switch to maintain the energization of the headlight circuit for the aforesaid period.

It will be noted that the initiated time delay hold-on of the vehicle headlamps may be cancelled prior to the expiration or timing out of the delay by closing the ignition switch. This applies positive or high level battery potential over circuit conductor 84 to the controller, effectively disabling the controller. Conductor 84 is connected through diode 86 to one side of relay 80 controlling the energization thereof when the ignition switch is closed, causing the relay to open its normally closed contacts 82 which de-energize the control relay 66 to open contacts 68. Thus, whenever the ignition switch is closed, the time delay controller is inoperative or disabled, irrespective of the condition of the vehicle light control switch.

From the foregoing, it can be appreciated that time delay hold-on operation of the vehicle headlamps is effected in accordance with a predetermined sequence, program or relative order of operation of the vehicle light control switch and the vehicle ignition switch; viz., the ignition switch is turned off first prior to or in advance of deactuation of the light control switch. Inverse operation of these controls overrides the delayed hold-on control function, as described above. Consequently, the system affords operator selection of delayed or immediate de-energization of the vehicle headlamps without the addition of defeat, override and restoration controls to the control system or disturbing the vehicle wiring system or the operating habits or patterns of the operator in the manipulation of these controls.

The subject controller effects a delayed hold-on of only the headlights of the vehicle and is effectively immunized or isolated from any undesirable turn-on and delayed hold-on function of the headlamps effected from the parking light circuit. This is accomplished in the present instance by the additional disabling circuit connection 87 from the parking lamp terminal (P) of the light control switch to the delay controller, as shown, to disable the controller and prevent turn-on of the headlamps when the light control switch is moved from its Park to Off position. Diodes 86 and 88 effectively isolate the parking light circuit and ignition circuit from one another to prevent feeding the parking light circuit through the ignition switch when the parking light switch is off and visa versa, the use of such isolation techniques being common practice.

The warning signal or headlamps-on reminder portion of the described system functions to provide a reminder or warning signal to alert the attention of the operator only in the event of operator failure to turn off the light control switch from either its Headlights On or Park position. The operator is thus warned or reminded to turn off the light control switch to prevent needless dissipation of the vehicle battery current. It will be noted that the signal is provided if either the headlamps and/or parking lamps remain energized through the light control switch, although only a single circuit connection is provided from the light control switch to the buzzer which is operative for both of these lighting circuits.

As the reminder circuit is connected to the taillight circuit of the vehicle, and neither the taillamps or the parking lamps are energized when the energization of the headlight circuit is being maintained from the auxiliary circuit effected by the time delay controller, the alarm signal will not be activated upon operation of the switch 56 even though the headlight circuit is thus temporarily maintained and energized. Consequently, the operation of the reminder system is compatible with and related to the operation of the time delay controller, and the buzzer will not produce a false alarm that would signal an energized condition of the headlamps when their energization is maintained by the time delay controller.

We claim:

1. In combination with a vehicle equipped with
   a source of electrical energy,
   a vehicle ignition system including
     a vehicle ignition circuit and an ignition switch connected to the source and operable between an off position, an ignition-on position and an accessory position, said switch having
     an ignition terminal connecting said ignition circuit to the source in the ignition-on position of the ignition switch and an accessory terminal connected to said source in the accessory position and in the ignition-on position of said switch,
   a vehicle lighting circuit and
   a vehicle light control switch controlling the energization and de-energization of the vehicle lighting circuit independently of the ignition switch and connected between the source and the vehicle lighting circuit;
   a time delay lighting circuit controller selectively operable in accordance with a predetermined sequence of shut-off operation of both the vehicle ignition switch and the vehicle light control switch to provide a time delayed shut-off of the vehicle lighting circuit subsequent to manual shut-off operation of both of said switches, said circuit controller including
     controllable switching means operable to provide a bypass circuit from the source about the vehicle light control switch to the vehicle lighting circuit,
   timing circuit means connected to the source and the light control switch and controlling the operation of said switching means for a predetermined period subsequent to shut-off operation of the vehicle light control switch, and
   timing circuit disabling means connected to the accessory terminal of said ignition switch and in disabling circuit relation with said timing circuit means whenever the vehicle ignition switch is in its ignition-on position as well as when it is in its accessory position.

2. The combination in accordance with claim 1 above wherein said lighting circuit is the vehicle headlight circuit,
   said vehicle further includes a parking light circuit and a tail light circuit;
   said light control switch is a multiple position selector switch operable from an off position to a first position and to a second position in the first of which positions the parking light circuit and the tail light circuit are connected through the lighting circuit selector switch for energization from the source and in the second of which positions the headlight circuit and the tail light circuit are connected through the lighting circuit selector switch for energization from the source,
   and wherein the combination further includes
     a discriminating signal warning circuit which includes a signal warning device and is connected to and in parallel with the tail light circuit for energization across the source when the lighting circuit selector switch is in either of its lighting circuit selector positions, said warning device operative to provide a signal warning when the headlight circuit is energized from the source through said lighting circuit selector switch but inoperative to provide said warning signal when the headlight circuit is energized from the source through said time delay controller.

3. The combination in accordance with claim 2 wherein said signal warning circuit also includes a vehicle condition responsive switch, such as a door switch, connected in series with said warning device and jointly controlling the operation of said warning device with said light control switch upon the occurrence of said condition when said light control switch is in either of its lighting circuit selector positions.

4. An automatic apparatus for switching the energization of a lamp circuit of a vehicle from a source of electrical energy between a first state and a second state, the lamp circuit including a manual switch connected in circuit with the source of electrical energy and the lamp for manually controlling the lamp circuit, the improvement comprising switch means connected in circuit with the manual switch for overriding the effect of the manual switch, and timing circuit means connected to the source of electrical energy and actuable to time a preselected period, including relay coil control means connected to said switch means for controlling the operation of the switch means in response to the timing of said period, said switch means being adapted to be connected between the source of energy and the lamp circuit to place the lamp circuit in the first state at the start of said period and place the lamp circuit in the second state in response to the timing of the end of said period, said timing circuit including a controllable semiconductor device connected in series with said relay coil, said semiconductor device being connected only to one terminal of the energy source and said relay coil being connected only to the opposite terminal of the energy source when said semiconductor device is conducting.

5. The invention of claim 4 further including an ignition switch, said invention further including automatic timing initiation circuit means connected to said timing circuit for starting the timing of said period, said timing initiation circuit being operable when the manual switch is actuated after the opening of the ignition switch.

6. The invention of claim 5 wherein said timing initiation circuit includes gate means connected to the timing circuit for controlling the flow of electrical energy to the timing circuit, said gate means being disabled in response to the closing of the ignition circuit.

7. In combination with a vehicle equipped with
a source of electrical energy,
a vehicle ignition system including
  a vehicle ignition circuit and
  an ignition switch connected to the source, said switch operable between an ignition-off position, an ignition-on position and an accessory position and having an ignition terminal connecting said ignition circuit to the source in the ignition-on position of the ignition switch and an accessory terminal connected to said source in the accessory position and in the ignition-on position of said switch,
a vehicle lighting circuit and
a vehicle light control switch controlling the energization and de-energization of the vehicle lighting circuit independently of the ignition switch and connected between the source and the vehicle lighting circuit;
a time delay lighting circuit controller selectively operable in accordance with a predetermined sequence of shut-off operation of the vehicle ignition switch relative to the vehicle light control switch to provide a time delayed shut-off of the vehicle lighting circuit subsequent to manual shut-off operation of both of said switches, said circuit controller including
  controllable switching means operable to provide a by-pass circuit from the source about the vehicle light control switch to the vehicle lighting circuit,
  relay coil control means for operation of said controllable switching means,
  a controllable semi-conductor device connected in series with said relay coil across said source when said semi-conductor device is conducting,
  energy storage timing means connected in conduction controlling relation with said semiconductor device to maintain the energization of the vehicle lighting circuit through said switching means for the timing period of said timing means when said vehicle light control switch has been shut off subsequent to shut off of the ignition switch, and timing circuit inhibiting means connected to the accessory terminal of said ignition switch and in conduction inhibiting circuit relation with said semi-conductor device whenever said vehicle ignition switch is in its ignition-on position as well as when it is in its accessory position.

8. The combination in accordance with claim 7 wherein said energy storage timing means comprises an R-C timing network.

9. An automatic for switching the energization of a lamp circuit of a vehicle from a source of electrical energy between a first state and a second state, the lamp circuit including a manual switch connected in circuit with the source of electrical energy and the lamp for manually controlling the lamp circuit, the vehicle further including an ignition switch, the improvement comprising switch means connected in circuit with the manual switch for overriding the effect of the manual switch, and timing circuit means connected to the source of electrical energy and actuable to time a preselected period including relay coil control means connected to said switch mean for controlling the operation of the switch means in response to the timing of said period, said switch means being adapted to be connected between the source of energy and the lamp circuit to place the lamp circuit in the first state at the start of said period and to place the lamp circuit in the second state in response to the timing of the end of said period, said timing circuit means including a controllable semi-conductor device connected in series with said relay coil control means across said energy source when said semi-conductor device is conducting, and timing initiation circuit means connected to said timing circuit means and to the ignition switch and to the manual switch for starting the timing of said period when the manual switch is opened after and only if the ignition switch has been opened.

10. An automatic apparatus for switching the energization of a lamp circuit of a vehicle from a source of electrical energy between a first state an a second state, the lamp circuit including a manual switch connected in circuit with the source of electrical energy and the lamp for manually controlling the lamp circuit, the vehicle further including an ignition switch, the improvement comprising switch means connected in circuit with the manual switch for overriding the effect of the manual switch, and timing circuit means connected to the source of electrical energy and actuable to time a preselected period including relay coil control means connected to said switch means for controlling the operation of the switch means in response to the timing of said period, said switch means being adapted to be connected between the source of energy and the lamp circuit to place the lamp circuit in the first state at the start of said period and to place the lamp circuit in the second state in response to the timing of the end of said period, said timing circuit means including a controllable semi-conductor device connected in series with said relay coil control means across said energy source when said semi-conductor device is conducting, and timing initiation circuit means connected to said timing circuit means and to the ignition switch for starting the timing of said period when the manual switch is actuated after opening of the ignition switch, said timing initiation circuit means including gate means connected to the timing circuit means for controlling the flow of electrical energy to the timing circuit means, said gate means being disabled in response to the closing of the ignition circuit.

* * * * *